United States Patent
Singh et al.

(10) Patent No.: US 12,309,865 B2
(45) Date of Patent: May 20, 2025

(54) UE-SPECIFIC METHODS FOR NR/LTE/3G/2G CALL PERFORMANCE IMPROVEMENT DURING IRAT RE-SELECTION PROCEDURE

(71) Applicant: Apple Inc., Cupertino, CA (US)

(72) Inventors: Ashish Kumar Singh, Munich (DE); Anshul Kumar Gupta, Bangalore (IN); Franz Goldhofer, Waakirchen (DE); Pradeep Pangi, Bangalore (IN); Mark Jeffery, Munich (DE); Avinash Venugopal, San Diego, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 17/899,698

(22) Filed: Aug. 31, 2022

(65) Prior Publication Data
US 2023/0076120 A1    Mar. 9, 2023

(30) Foreign Application Priority Data

Aug. 31, 2021 (IN) .............................. 202141039326

(51) Int. Cl.
  *H04W 76/18*  (2018.01)
  *H04W 36/14*  (2009.01)
(52) U.S. Cl.
  CPC ........ *H04W 76/18* (2018.02); *H04W 36/1443* (2023.05)
(58) Field of Classification Search
  CPC . H04W 76/18; H04W 36/1443; H04W 48/18; H04W 88/06; H04W 76/10
  (Continued)

(56) References Cited

U.S. PATENT DOCUMENTS 9,374,738 B2  6/2016  Yang
9,398,499 B2  7/2016  Kim
(Continued)

FOREIGN PATENT DOCUMENTS

JP  H10-285638  10/1998

OTHER PUBLICATIONS

Office Action for JP Pat. Application No. 2022-138098; Jul. 27, 2023.
(Continued)

*Primary Examiner* — Huy C Ho
(74) *Attorney, Agent, or Firm* — Kowert, Hood, Munyon, Rankin & Goetzel, P.C.

(57) ABSTRACT

Methods, apparatuses, and systems are disclosed for reducing latency during IRAT re-selection in the presence of race conditions. When a UE initiates an IRAT re-selection procedure, and concurrently initiates a call setup procedure, a race condition may result, in which the UE's NAS layer prioritizes the call setup procedure, while the RRC layer prioritizes the IRAT re-selection procedure. This may result in failure of the call setup procedure, which may lead to a user needing to re-initiate the call, resulting in poor user experience and significant latency. To prevent this, the UE may cache a message and/or other information relevant to the call setup procedure, until the IRAT re-selection procedure is complete. The UE may then proceed to complete the call setup procedure. The message may be cached, e.g., at the NAS layer or the RRC layer of the cellular modem, or by an application processor.

20 Claims, 14 Drawing Sheets

(58) Field of Classification Search
USPC .......................................................... 370/331
See application file for complete search history.

(56) References Cited

U.S. PATENT DOCUMENTS

2013/0242898 A1* 9/2013 Johansson ............. H04W 24/02
370/329
2016/0037388 A1* 2/2016 Yang ................... H04W 36/302
370/332

OTHER PUBLICATIONS

Extended European Search Report for European Patent Application No. 22192230.5; Jan. 27, 2023.
"3rd Generation Partnership Project; Technical Specification Group Radio Access Network; NR; User Equipment (UE) procedures in Idle mode and RRC Inactive state (Release 15)", 3GPP Draft; DRAFT_38304-F70, 3rd Generation Partnership Project (3GPP), Mobile Competence Centre ; 650, Route Des Lucioles ; F-06921 Sophia-Antipolis Cedex; France; Jul. 2019.

* cited by examiner

UE-SPECIFIC METHODS FOR NR/LTE/3G/2G CALL PERFORMANCE IMPROVEMENT DURING IRAT RE-SELECTION PROCEDURE

PRIORITY INFORMATION

This application claims priority to Indian patent application serial number 202141039326, entitled "UE-Specific Methods for NR/LTE/3G/2G Call Performance Improvement During IRAT Re-selection Procedure," filed Aug. 31, 2021, which is hereby incorporated by reference in its entirety as though fully and completely set forth herein.

FIELD

The present application relates to wireless communications, and more particularly to systems, apparatuses, and methods for reducing latency during IRAT re-selection in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure an acceptable user experience when utilizing user equipment (UE) devices, such as cellular phones and smart devices. Accordingly, improvements in the field are desired.

SUMMARY

Embodiments are presented herein of apparatuses, systems, and methods for reducing latency during Inter-Radio Access Technology (IRAT) re-selection in a wireless communication system, in the presence of race conditions.

For example, a method is described for expediting call establishment. The method may be performed by a cellular modem of a user equipment (UE) device. The cellular modem may initiate an Inter-Radio Access Technology (IRAT) re-selection procedure, and, while the IRAT re-selection procedure is pending, may also receive a request to initiate a call setup procedure. In response to determining that the IRAT re-selection procedure is pending, the cellular modem may suspend processing of the call setup procedure. The cellular modem may then complete the IRAT re-selection procedure. In response to determining that the IRAT re-selection procedure is complete, the cellular modem may resume the processing of the call setup procedure.

In some scenarios, suspending processing of the call setup procedure may include a radio resource control (RRC) layer of the cellular modem caching a request to resume a suspended call connection. In some scenarios, suspending processing of the call setup procedure may include the RRC layer of the cellular modem caching a request to establish a new call connection.

In some scenarios, suspending processing of the call setup procedure may include a non-access stratum (NAS) layer of the cellular modem caching a call setup request message.

In some scenarios, completing the IRAT re-selection procedure may include failing to switch to a new cell. In some scenarios, completing the IRAT re-selection procedure may include camping on a new cell.

In some scenarios, resuming the processing of the call setup procedure may include establishing a call on the new cell.

As another example, another method is described for expediting call establishment, the method performed by a processor of a user equipment (UE) device. The processor may provide, to a cellular modem of the UE device, a first request to initiate a call setup procedure. The processor may receive, from the cellular modem, an indication that the call setup procedure failed because the cellular modem is presently performing an Inter-Radio Access Technology (IRAT) re-selection procedure. In response to the indication that the call setup procedure failed, the processor may store call context information regarding the requested call setup procedure. In response to an indication from the cellular modem that the IRAT re-selection procedure is complete, the processor may provide, to the cellular modem, a second request to initiate the call setup procedure, based on the stored call context information.

In some scenarios, the processor may receive an initial request from a user interface component of the UE device to initiate the call setup procedure, wherein the first request is responsive to the initial request, and wherein the second request is provided without additional input from the user interface component.

Apparatuses, systems, and non-transitory memory media are described for implementing these and other methods.

A UE device is described, which includes at least one processor and a cellular modem, communicatively coupled to the at least one processor. The cellular modem may be configured to initiate an Inter-Radio Access Technology (IRAT) re-selection procedure. While the IRAT re-selection procedure is pending, the cellular modem may receive, from the at least one processor, a request to initiate a call setup procedure. In response to determining that the IRAT re-selection procedure is pending, the cellular modem may suspend processing of the call setup procedure. The cellular modem may then complete the IRAT re-selection procedure. In response to determining that the IRAT re-selection procedure is complete, the cellular modem may resume the processing of the call setup procedure.

In some scenarios, suspending processing of the call setup procedure may include a radio resource control (RRC) module of the cellular modem storing a request to resume a suspended call connection. In some scenarios, suspending processing of the call setup procedure may include a radio resource control (RRC) module of the cellular modem storing a request to establish a new call connection. In some scenarios, suspending processing of the call setup procedure may include a non-access stratum (NAS) module of the cellular modem storing a call setup request message.

In some scenarios, completing the IRAT re-selection procedure may include failing to switch to a new cell. In some scenarios, completing the IRAT re-selection procedure may include camping on a new cell.

In some scenarios, resuming the processing of the call setup procedure may include establishing a call on the new cell.

A cellular modem is described, which may include a non-access stratum (NAS) module and a radio resource control (RRC) module. The RRC module may be configured to store a request message from the NAS module in response to determining that the request message is received during a pending Inter-Radio Access Technology (IRAT) re-selection procedure. The RRC module may subsequently process the request message in response to determining that the IRAT re-selection procedure has been completed. The request message may include one of: a request to establish a call connection or a request to resume a call connection. Processing the requested message may include attempting to establish or resume the call connection.

A cellular modem is described, which may include a radio resource control (RRC) module and a non-access stratum (NAS) module. The NAS module may be configured to receive a call setup request, and provide to the RRC module a first call connection request message, based on the call setup request. The first call connection request message may include a request to establish or resume a call connection. The cellular modem may receive, from the RRC module, a rejection message indicating that the request to establish or resume the call connection was rejected because the cellular modem is performing an Inter-Radio Access Technology (IRAT) re-selection procedure. In response to receiving the rejection message, the cellular modem may store the call setup request. The cellular modem may then receive, from the RRC module, an indication that the IRAT re-selection procedure is complete. In response to the indication that the IRAT re-selection procedure is complete, the cellular modem may provide to the RRC module a second call connection request message, based on the stored call setup request, the second call connection request message including a request to establish or resume a call connection.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
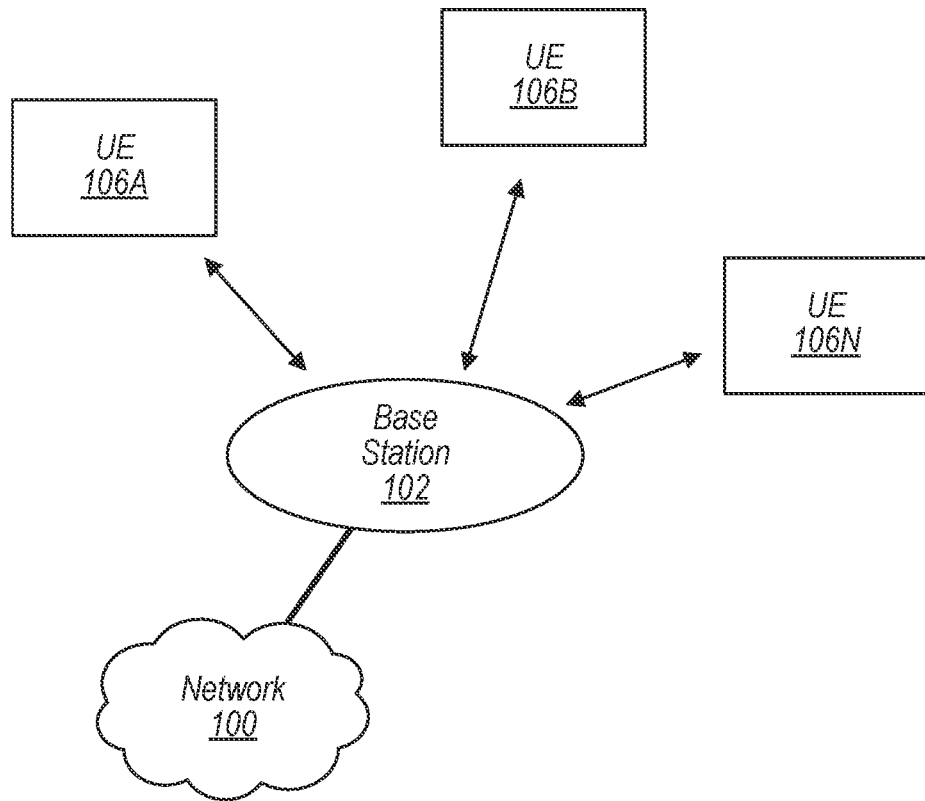
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
GSM: Global System for Mobile Communication
UMTS: Universal Mobile Telecommunication System
EUTRA: Evolved UMTS Terrestrial Radio Access
LTE: Long Term Evolution
NR: New Radio
TX: Transmission/Transmit
RX: Reception/Receive
RAT: Radio Access Technology
IRAT: Inter-Radio Access Technology
AP: Application Processor
NAS: Non-Access Stratum
RRC: Radio Resource Control
NW: Network Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
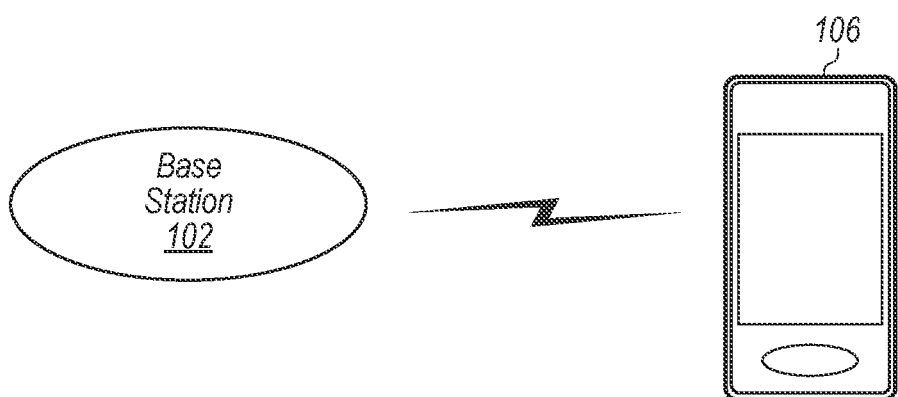
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternatively be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for reducing latency during IRAT reselection in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLU-ETOOTH™. Other configurations are also possible.

Figure 3:
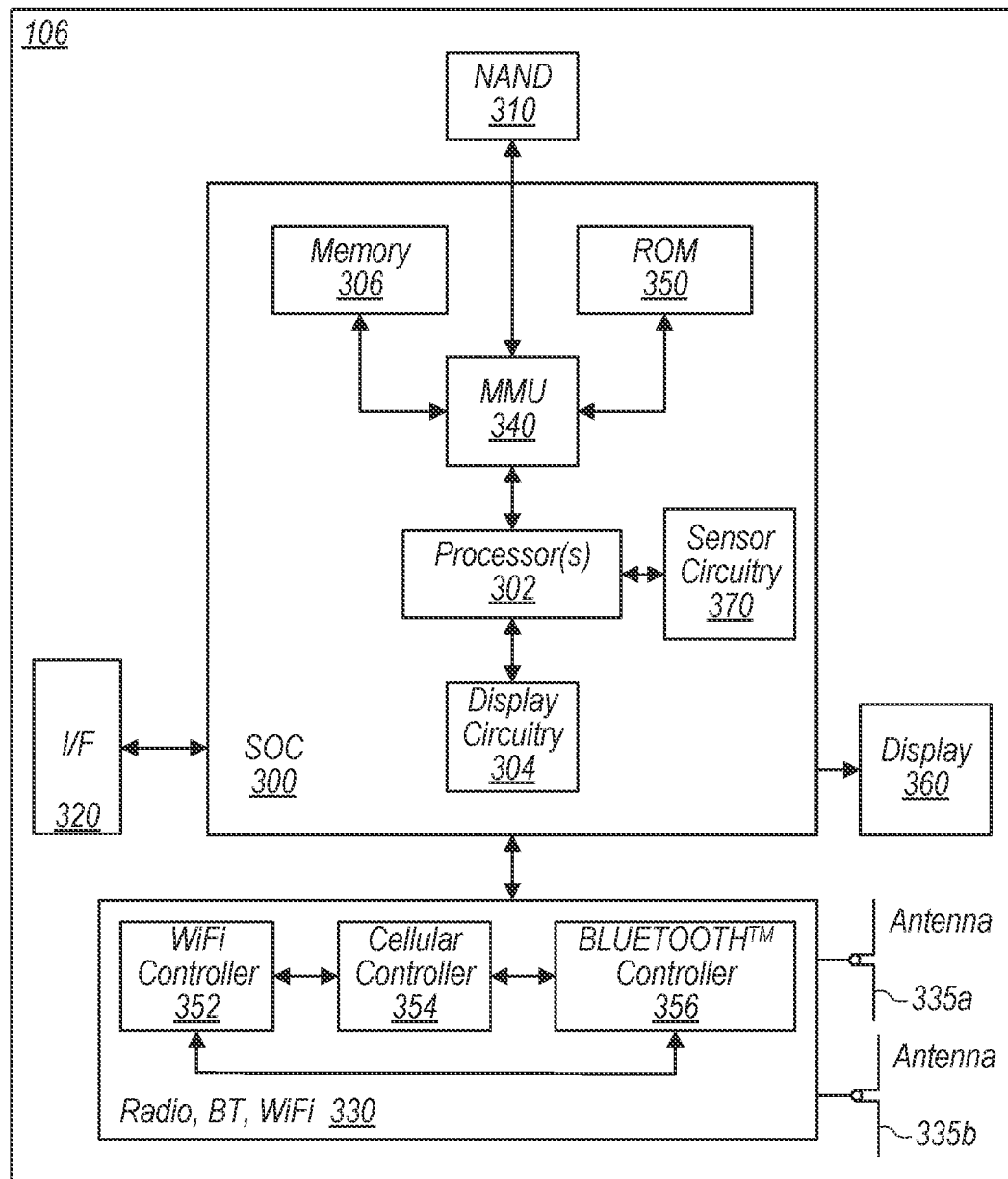
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. In some implementations, the display 360 may include a touchscreen capable of detecting user input, e.g., as touch events. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to reduce latency during IRAT re-selection in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to reduce latency during IRAT re-selection in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE, LTE-A, and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
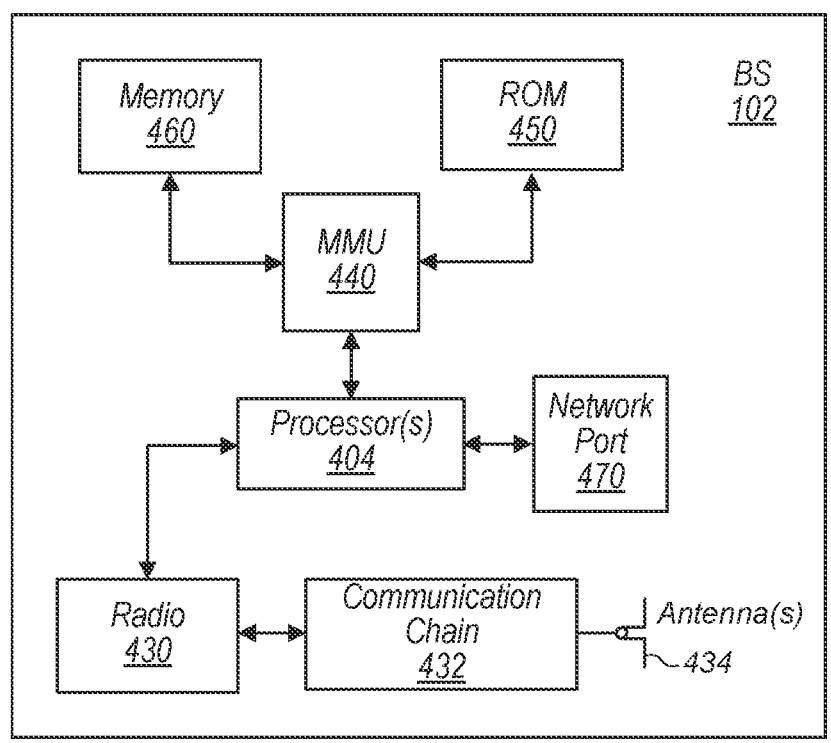
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE device 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

FIGS. 5-8— Race Conditions Between Call Setup and IRAT Re-Selection

Inter-Radio Access Technology (IRAT or inter-RAT) re-selection may involve a UE, such as the UE 106, switching from being camped on a cell of a first RAT (e.g., NR) to being camped on a cell of a second RAT (e.g., LTE). During IRAT re-selection by the UE from NR to LTE (or vice versa), or between other RATs, if call setup is triggered for any reason (e.g., MO-signaling, MO-data, emergency, etc.), the resulting race conditions may result in call failure and/or latency in call setup, which may be observed by the end user, depending upon implementation in the UE.

Certain aspects of IRAT re-selection procedures may be defined by applicable standards, such as 3GPP TS 38.304 V16.5.0 (which is hereby incorporated by reference in its entirety, as if fully and completely disclosed herein), among others. However, other aspects may not be defined by any standard, and may therefore be implemented according to vendor preference. In race conditions, such as those outlined above, different UE vendors may implement different responses, and in a naive UE implementation, the NRRC layer may reject a call Establishment request or call Resume request from the Non-Access Stratum (NAS) while IRAT re-selection is in progress, which may, in turn, cause the NAS layer to also send a rejection to its upper layer. This may result in call failure, which may be noticed by the end user.

Figure 5A:
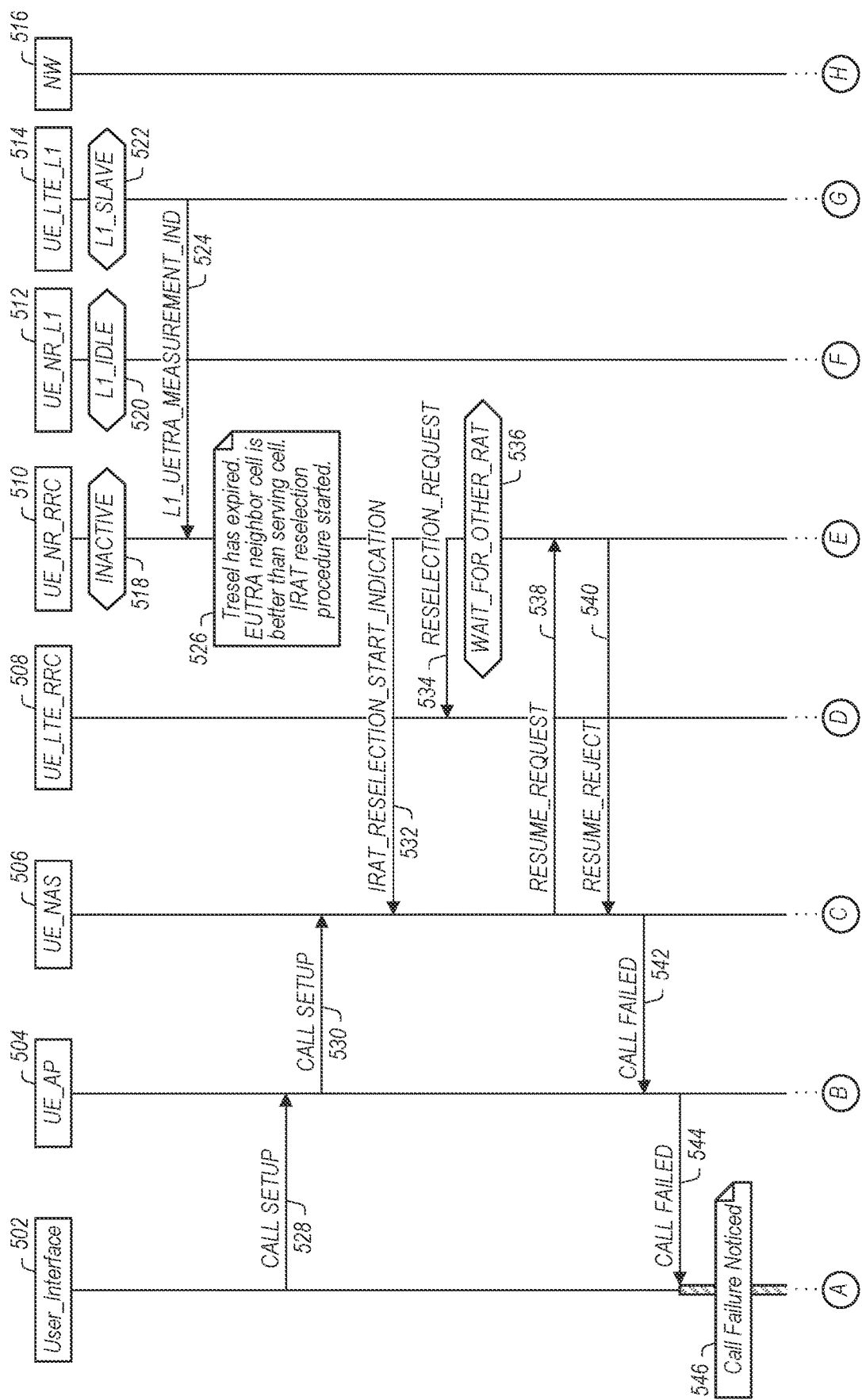
FIGS. 5A-B illustrate a signal flow diagram presenting an example of race conditions between call setup and IRAT re-selection resulting in significant delay observed by the user, according to the prior art.
Figure 5B:
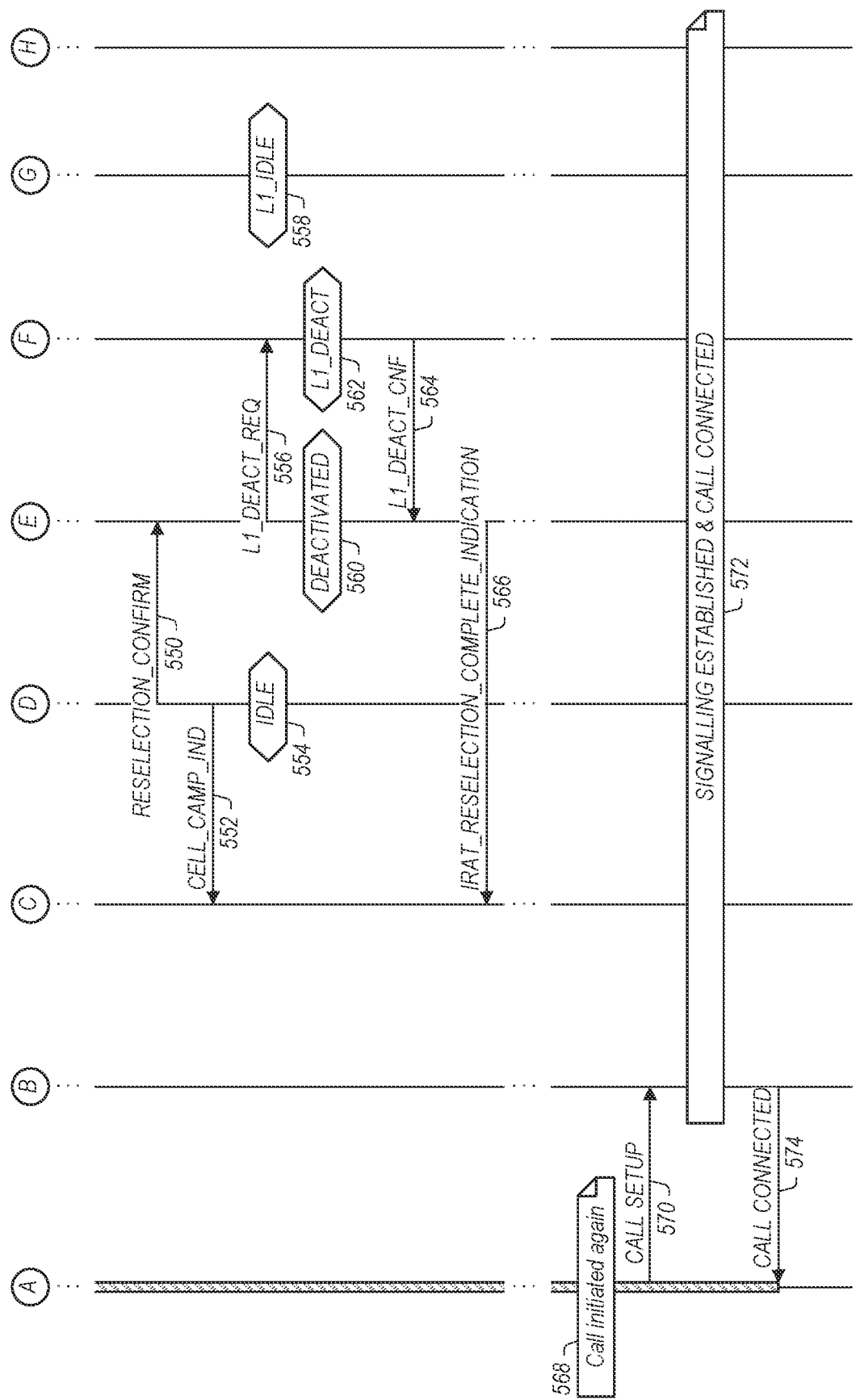

FIGS. 5A-B illustrate a signal flow diagram presenting an example of such a naïve implementation, when transitioning from NR to LTE. FIGS. 5A-B illustrate a cellular network (NW) 516, as well as several distinct aspects of a UE, such as the UE 106. The user interface 502 may include any type of user interface component of the UE that allows initiation of a user call and/or notification of call establishment or failure. For example, the user interface 502 may be, or include, a touchscreen, such as the display 360. The UE application processor (AP) 504 may include any processor configured to run application software capable of interacting with the user interface 502. For example, the UE AP 504 may be, or include, one or more of the processor(s) 302.

The UE NAS 506 may represent hardware and/or software (e.g., a module) within the UE for implementing the non-access stratum layer of the UE. Similarly, the UE LTE radio resource control (RRC) 508 may represent hardware and/or software (e.g., a module) within the UE for implementing the RRC layer for LTE communications, while the UE NR RRC 510 may represent hardware and/or software (e.g., a module) within the UE for implementing the RRC layer for NR communications. The UE LTE L1 514 may represent hardware and/or software (e.g., a module) within the UE for implementing the physical layer (L1) for LTE communications, while the UE NR L1 512 may represent hardware and/or software (e.g., a module) within the UE for implementing L1 for NR communications. In some implementations, the UE NAS 506, the UE LTE RRC 508, the UE NR RRC 510, the UE NR L1 512, and/or the UE LTE L1 514 may be included in a cellular modem of the UE, e.g., within the wireless communication circuitry 330 or the cellular controller 354. For example, the cellular modem may include functions, modules, etc. for implementing the illustrated elements 506-514.

As illustrated in FIG. 5A, the UE begins with the UE LTE L1 514 in L1 SLAVE mode (522) and the UE NR L1 512 in L1 IDLE state (520). The UE NR RRC 510 is in INACTIVE state (518). The UE LTE L1 514 provides to the UE NR RRC 510 an LTE L1 EUTRA Measurement Indication 524, for use in determining whether to perform an IRAT re-selection. In response, the UE NR RRC 510, at 526, initiates an IRAT re-selection procedure. For example, the UE NR RRC 510 may initiate the IRAT re-selection procedure based on determining that $T_{reselect}$ has expired and that an EUTRA neighbor cell (e.g., an LTE cell) is ranked above the presently serving cell (e.g., an NR cell).

Independent of this initiation of an IRAT re-selection procedure, a user initiates a call by interacting with the user interface 502. This causes the user interface 502 to provide a call setup instruction 528 to the UE AP 504, which similarly provides a call setup instruction 530 to the UE NAS 506.

At some time thereafter, the UE NR RRC 510 provides to the UE NAS 506 an IRAT reselection start indication 532. The UE NR RRC 510 also provides to the UE LTE RRC 508 a reselection request 534, and then waits for a reply based on input from the other RAT (LTE).

In this scenario, the UE NAS 506 receives the call setup instruction 530 before being notified of the IRAT re-selection. The UE NAS 506 therefore acts to complete the call setup procedure prior to acting on the IRAT re-selection procedure. However, the UE NR RRC 510 begins the re-selection process prior to receiving from the UE NAS 506 any notification of the call initiation. Thus, the UE NR RRC 510 prioritizes the IRAT re-selection procedure. Specifically, upon receiving the call setup instruct 530, the UE NAS 506 provides to the UE NR RRC 510 a resume request message 538. Because the UE NR RRC 510 is already in the midst of performing an IRAT reselection procedure, it responds to the UE NAS 506 with a resume reject message 540.

Upon receiving this message, the UE NAS 506 provides to the UE AP 504 a call failed message 544, and the UE AP 504 provides a call fail message 544 message to the user interface 502, e.g., for display to the user.

At this point, the IRAT re-selection continues as usual. E.g., the IRAT re-selection is not affected by the failed call establishment. As illustrated, the UE LTE RRC 508 provides to the UE NR RRC 510 a reselection confirmation message 550, and also provides to the UE NAS 506 a cell camp indication 552, indicating that the UE is now camped on the LTE network. The UE LTE RRC 508 then enters IDLE state 554. The UE LTE L1 514 similarly enters L1 IDLE state 558.

In response to the reselection confirmation 550, the UE NR RRC 510 provides to the UE NR L1 512 an L1 deactivation request message. The UE NR RRC 510 then enters a DEACTIVATED state 560. The UE NR L1 512 enters an L1 DEACTIVATED state 562, and provides to the UE NR RRC 510 an L1 deactivation confirmation message 564. In response, the UE NR RRC 510 provides to the UE NAS 506 an IRAT reselection complete indication 566.

Despite this successful completion of the IRAT reselection process, the user must re-initiate the failed call. For example, at 546 the user may notice an indication on the user interface 502 that the call failed, and may initiate the call again at 568. In an average scenario, this may commonly take several seconds, e.g., 2-5 seconds. Thus, the IRAT re-selection process is likely to be complete (either successful or unsuccessful) well before the second call initiation attempt. Therefore, this second call initiation may proceed according to normal procedures, without further interference from the IRAT re-selection procedure. For example, as illustrated, the user interface 502 responds to the user input by providing to the UE AP 504 a call setup message 570, which may be substantially similar to the call setup message 528. The UE may then proceed to establish the call with the LTE cell according to normal procedures as known in the art, as summarized at 572. Upon completion of the call establishment, the UE AP 504 provides to the user interface 502 a call connected message 574, and the user interface 502 may notify the user of the successful call establishment.

The call failure and associated delay experienced in this example may be considered unacceptable in some use cases. For example, certain call failure key performance indicators (KPI) may be broken.

It should be appreciated that the example of FIGS. 5A-B illustrates an RRC Resume procedure, but the signal flow would be substantially similar for an RRC Connection Establishment procedure. Similarly, the example of FIGS. 5A-B illustrates an IRAT re-selection from NR to LTE, but the signal flow would be substantially similar for an IRAT re-selection from LTE to NR, or between other RATs. Similarly, the example of FIGS. 5A-B illustrates a successful IRAT re-selection procedure, but the effects observed by the user would be substantially similar in a scenario in which the IRAT re-selection procedure failed.

To eliminate the unacceptable call failure and latency experienced in the example of FIGS. 5A-B, the UE may determine that an IRAT re-selection is in progress concurrent with a connection establishment or resume procedure, and may respond by temporarily suspending the connection establishment or resume procedure. For example, the UE NR RRC may cache a NAS resume (or establishment) request message until after success or failure of the IRAT re-selection, and then proceed with resuming/establishing the call. Alternatively, the UE AP may cache call context information, such as a Call Setup message until receiving notification of completion of the IRAT re-selection procedure, and then proceed with call setup. As another alternative, the UE NAS may cache the Call Setup message until receiving notification of completion of the IRAT re-selection procedure, and then proceed with resuming/establishing the call. FIGS. 6-8 illustrate example scenarios implementing these alternatives, according to some embodiments.

Figure 6A:
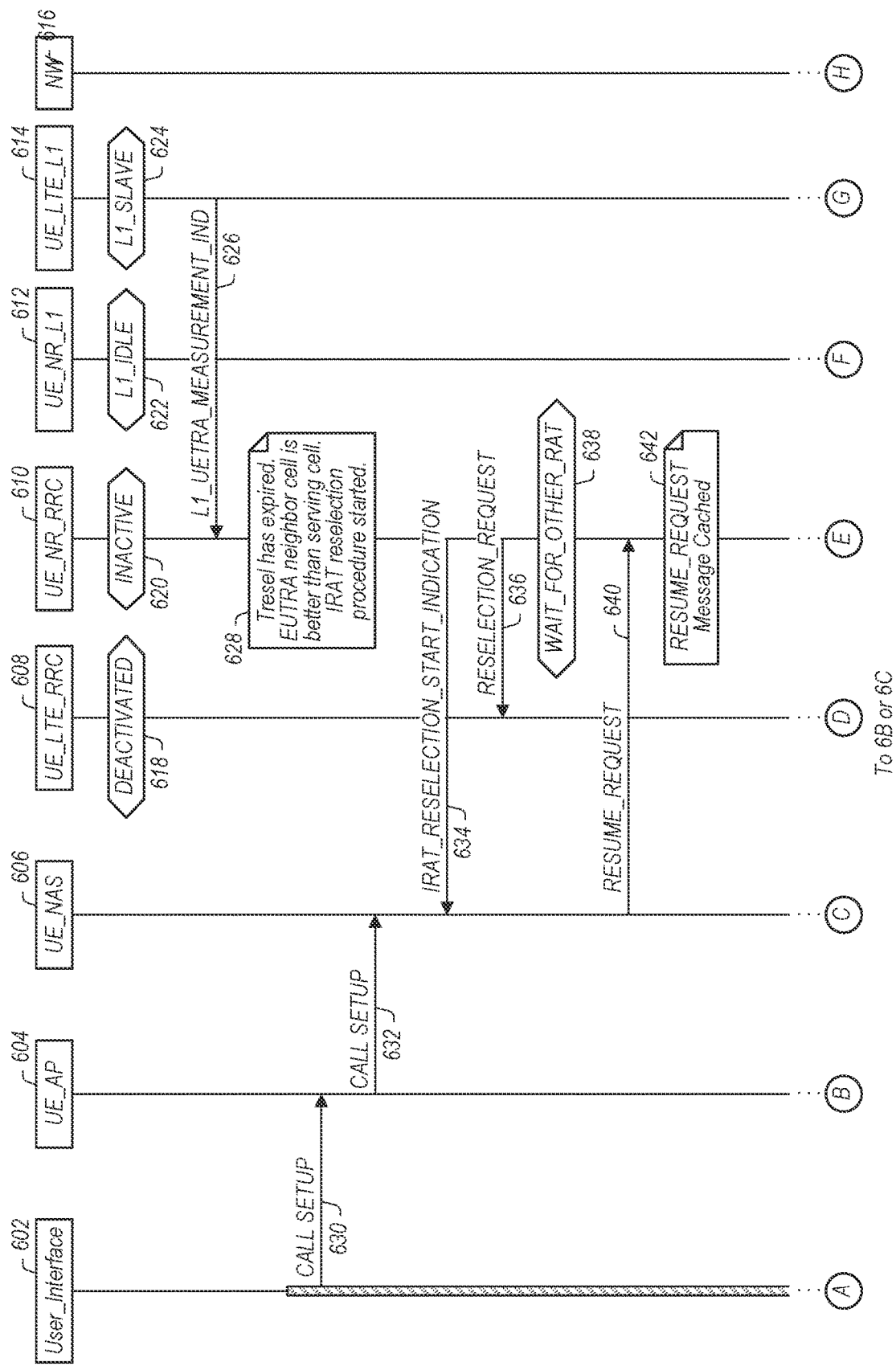
FIGS. 6A-C illustrate signal flow diagrams presenting example scenarios in which the NRRC may cache a resume request message during an IRAT re-selection, according to some embodiments.
Figure 6B:
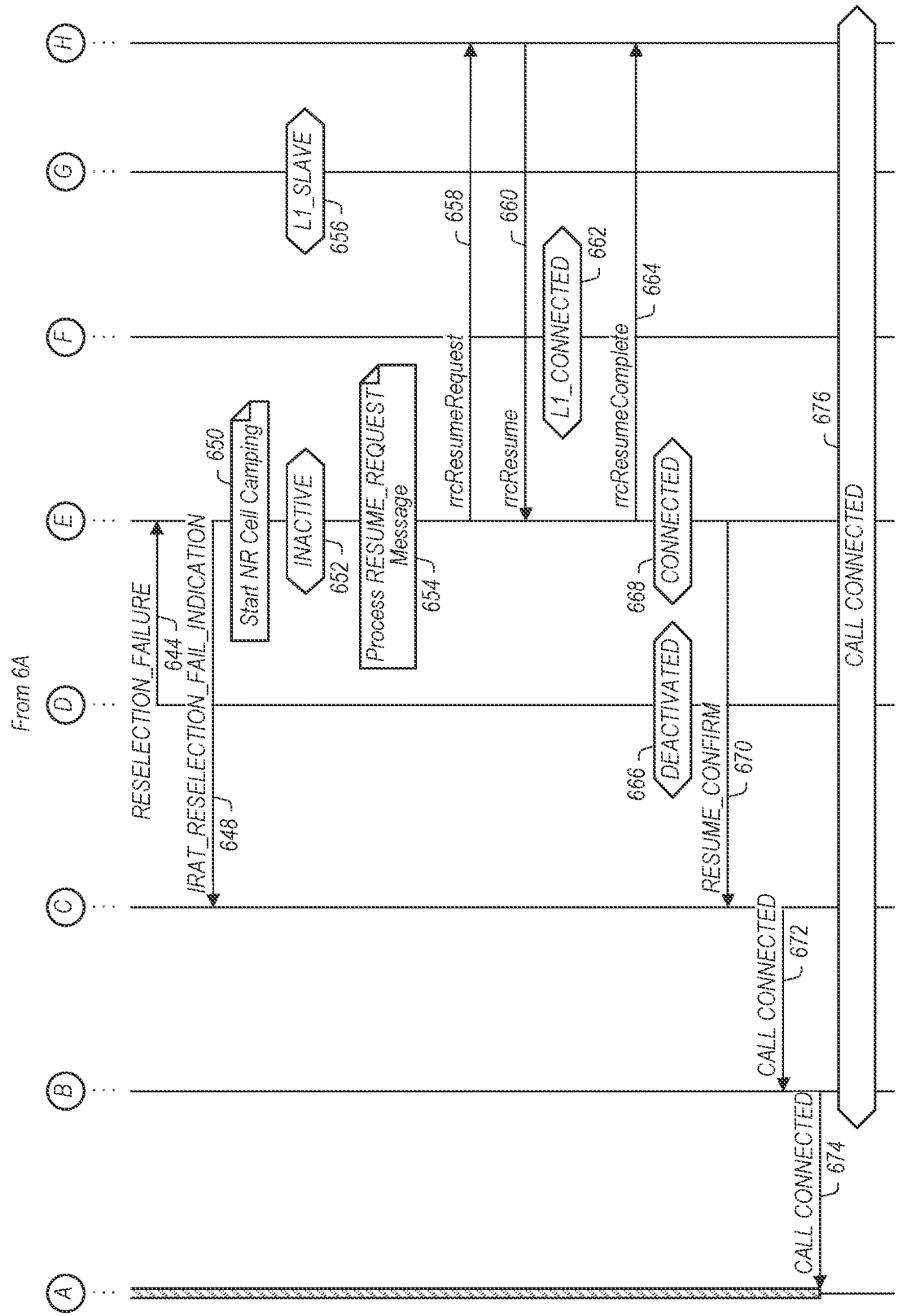
Figure 6C:
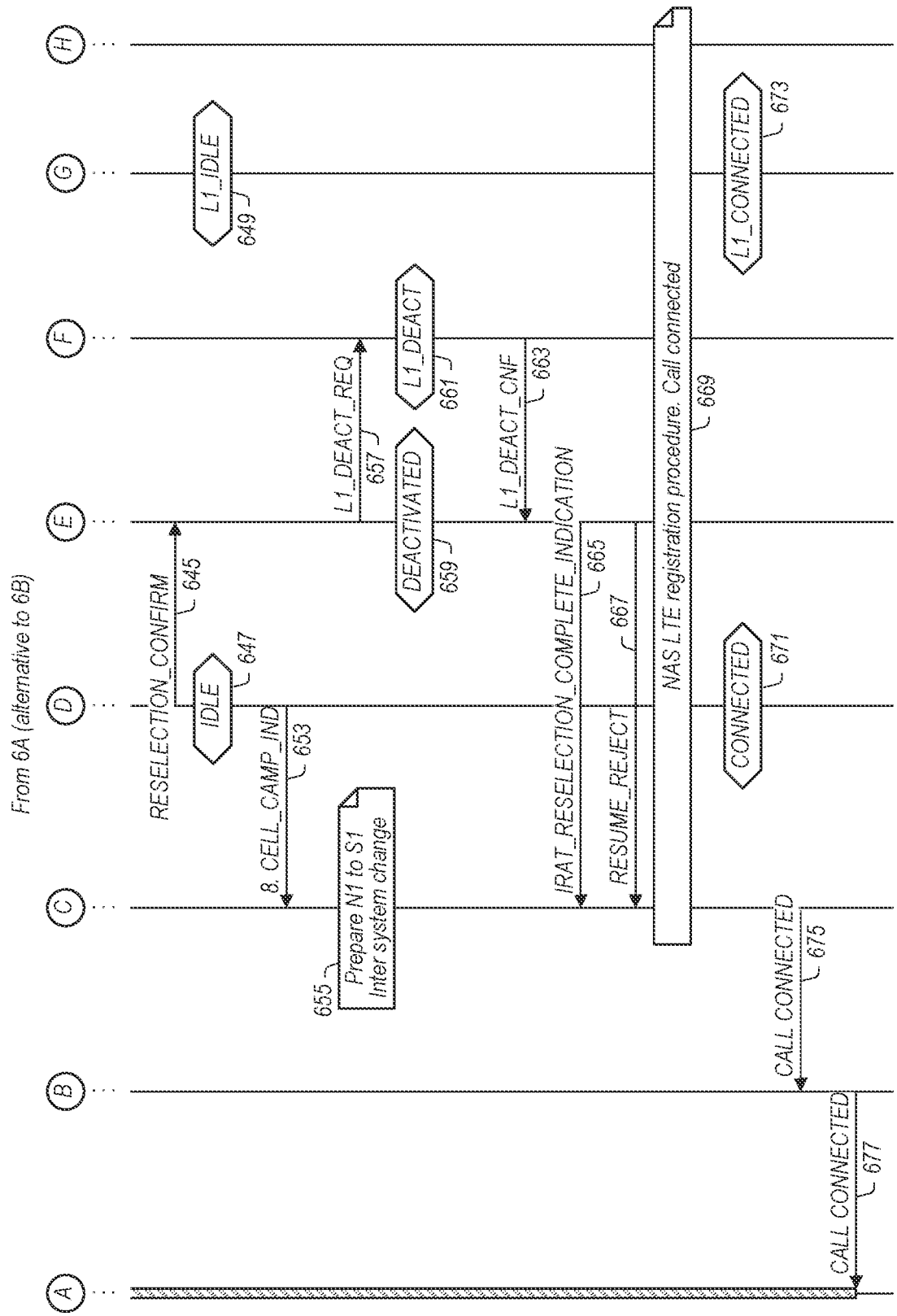

FIGS. 6A-C illustrate signal flow diagrams presenting example of scenarios in which the NR RRC layer caches a Resume Request message until the IRAT re-selection is complete, according to some embodiments. Specifically, FIG. 6A illustrates initiation of the scenario, until the NR RRC layer caches the Resume Request message. FIG. 6B illustrates an example signal flow for completion of the flow diagram of FIG. 6A, wherein the IRAT re-selection fails. FIG. 6C illustrates an alternative signal flow for completion of the flow diagram of FIG. 6A, in which the IRAT re-selection is successful.

It should be understood that a substantially similar flow diagram may be applied in a scenario in which a Connection Establishment Request is cached.

The various components of the UE and network illustrated in FIG. 6A may be similar or identical to the corresponding components illustrated in FIG. 5A, except that the components of FIG. 6A have been improved to implement the solution illustrated in the FIGS. 6A-C. For example, the user interface 602 may be substantially similar to the user interface 502, the UE AP 604 may be substantially similar to the UE AP 504, etc.

As illustrated in FIG. 6A, the UE may begin with the UE LTE L1 614 in L1 SLAVE mode (624) and the UE NR L1 612 in L1 IDLE state (622). The UE NR RRC 610 may begin in INACTIVE state (620), and the UE LTE RRC 608 may begin in DEACTIVATED state (618). The UE LTE L1 614 may provide to the UE NR RRC 610 an LTE L1 EUTRA Measurement Indication 626, for use in determining whether to perform an IRAT re-selection. In response, the UE NR RRC 610, at 628, may initiate an IRAT re-selection procedure. For example, the UE NR RRC 610 may initiate the IRAT re-selection procedure based on determining that $T_{reselect}$ has expired and that an EUTRA neighbor cell (e.g., an LTE cell) is ranked above the presently serving cell (e.g., an NR cell).

Similar to FIG. 5A, a user may initiate a call by interacting with the user interface 602. This may cause the user interface 602 to provide a call setup instruction 630 to the UE AP 604, which may similarly provide a call setup instruction 632 to the UE NAS 606.

At some time thereafter, the UE NR RRC 610 may provide to the UE NAS 606 an IRAT reselection start indication 634, to indicate that the IRAT re-selection procedure has begun. The UE NR RRC 610 may also provide to the UE LTE RRC 608 a reselection request 636, and may then wait (638) for a reply based on input from the other RAT (LTE).

As in the scenario of FIG. 5, in this scenario, the UE NAS 606 receives the call setup instruction 632 before being notified of the IRAT re-selection. The UE NAS 606 may therefore act to complete the call setup procedure prior to acting on the IRAT re-selection procedure. However, the UE NR RRC 610 may begin the re-selection process prior to receiving from the UE NAS 606 any notification of the call initiation. Thus, the UE NR RRC 610 may prioritize the IRAT re-selection procedure. Specifically, upon receiving the call setup instruct 632, the UE NAS 606 may provide to the UE NR RRC 610 a resume request message 640.

In the scenario of FIG. 6A, the UE NR RRC 610 does not respond to the UE NAS 606 with a resume reject message. Instead, the UE NR RRC 610 may, at 642, cache (or otherwise store) the resume request message 640 (or relevant information therefrom), e.g., in response to determining that the IRAT re-selection procedure is pending (e.g., has begun, but has not yet been completed).

It should be appreciated that, in some scenarios, the relative timing between the IRAT re-selection procedure and the call setup procedure may vary, without any meaningful change to the illustrated scenario. For example, in some scenarios, the UE NAS 606 may provide the resume request message 640 prior to receiving the IRAT reselection start indication 634. However, the UE NR RRC 610 may still respond to the resume request message 640 by caching the message, because the IRAT re-selection procedure is already pending. The factors that create the relevant race conditions are that the UE NAS 606 receives the call setup message 632 prior to being notified of the IRAT re-selection, causing the UE NAS 606 to prioritize the call setup, while the UE NR RRC 610 initiates the IRAT re-selection before receiving the resume request message 640, causing the UE NR RRC 610 to prioritize the IRAT re-selection. The timings and sequence of the various messages may vary within these constraints, while still resulting in the same race conditions, and may therefore still be addressed by the solutions presented herein.

FIG. 6B illustrates the remainder of the example signal flow diagram for the scenario in which the re-selection procedure fails. As illustrated, the UE LTE RRC 608 may, in response to the reselection request 636, provide to the UE NR RRC 610 a reselection failure message 644. This may result, e.g., from the UE failing to camp on the LTE cell for any reason. In response, the UE NR RRC 610 may provide to the UE NAS 606 an IRAT reselection fail indication 648. The UE NR RRC 610 may also, at 650, reinitiate camping on the NR cell; e.g., on the original cell. The UE NR RRC 610 may then return to the INACTIVE state (652), and the UE LTE L1 614 may return to the L1 SLAVE state (656).

At this point, the re-selection process is complete. The UE NR RRC 610 may therefore proceed to handle the previously received resume request. Specifically, the UE NR RRC 610 may, at 654, process the resume request message 640, which was cached at 642. In some implementations, the UE NR RRC 610 may treat the resume request message 640 as if it had been received after completion of the IRAT re-selection procedure (e.g., after 652). For example, the UE NR RRC 610 may provide to the NW 616 an rrcResumeRequest message 658, or other request to resume an RRC connection with the NR cell.

In response, the NW 616 may provide to the UE NR RRC 610 an rrcResume message 660, or other message indicating that the RRC connection has been resumed with the NR cell on the network side, and the UE NR L1 612 may enter an L1 CONNECTED state (662). The UE NR RRC 610 may then provide to the NW 616 an rrcResumeComplete message 664, or other message indicating that resumption of the RRC connection is complete on the UE side. The UE NR RRC 610 may then enter the CONNECTED state (610), and the UE LTE RRC may resume the DEACTIVATED state (666).

At this point, the UE NR RRC 610 may provide to the UE NAS 606 a resume confirmation message 670, indicating that the call has been successfully resumed. In response, the UE NAS 606 may provide a call connected message 672 to the UE AP 604, and the UE AP 604 may respond by providing a call connected message 674 to the user interface 602. In some scenarios, the user interface 602 may notify the user that the call setup was successful. As shown at 676, the call may then proceed via the established connection.

In this scenario, the average time elapsed between the call setup message 630 and the call connected message 674 may typically be in the range of 100-250 ms. This represents significant improvement, relative to the 2-5 seconds typical for the user to reinitiate the call, as discussed in connection with FIGS. 5A-B. Additionally, the scenario of FIGS. 6A-B eliminate the need for the user to make a second attempt to initiate the call, thus resulting in an improved user experience.

In some scenarios, the re-selection process may be successful, contrary to the example of FIG. 6B. FIG. 6C illustrates such an example. Specifically, FIG. 6C illustrates the remainder of the example signal flow diagram of FIG. 6A, for the scenario in which the re-selection procedure succeeds. Thus, the scenario of FIG. 6C is an alternative scenario to the scenario of FIG. 6B.

As illustrated in FIG. 6C, the UE LTE RRC 608 may, in response to the reselection request 636, provide to the UE NR RRC 610 a reselection confirm message 645, confirming that re-selection may proceed. The UE LTE RRC 608 may then enter the IDLE state (647). The UE LTE RRC 608 may also provide to the UE NAS 606 a cell camp indication 653, indicating that the UE is now camped on the LTE cell. The UE NAS 606 may respond, at 655, by preparing an N1-to-S1 Inter-System change, e.g., as known in the art.

In response to the reselection confirm message 645, the UE NR RRC 610 may provide to the UE NR L1 612 an L1 deactivation request 657. In response, the UE NR L1 612 may enter the L1 DEACTIVATED state (661), while the UE NR RRC 610 may enter the DEACTIVATED state (659). The UE NR L1 612 may then respond to the UE NR RRC 610 with an L1 deactivation confirmation message 663. At this point, the UE NR RRC 610 may provide to the UE NAS 606 an IRAT reselection complete indication 665.

Once the IRAT re-selection procedure is complete, the UE NR RRC 610 may process the resume request message 640, which was cached at 642. In some implementations, the UE NR RRC 610 may treat the resume request message 640 as if it had been received after completion of the IRAT re-selection procedure (e.g., after 663 and/or 665). Because the UE is now camped on the LTE cell, the UE NR RRC 610 may provide to the UE NAS 606 a resume reject message 667, as the UE cannot resume the connection to the NR cell.

In response, the UE NAS 606 may perform a NAS LTE registration procedure, as known in the art, resulting in a call connection. For example, this procedure may include the UE NAS 606 providing an establishment request, followed by network signaling, such as rrcConnectionRequest, rrcConnectionSetup, and rrcConnectionSetupComplete, message, followed by the UE NAS 606 receiving an establishment confirmation message. At this point, the UE LTE RRC 608 may enter the CONNECTED state (671), and the UE LTE L1 614 may enter the L1 CONNECTED state (673).

The UE NAS 606 may provide a call connected message 675 to the UE AP 604, and the UE AP 604 may respond by providing a call connected message 677 to the user interface 602. In some scenarios, the user interface 602 may notify the user that the call setup was successful. The call may then proceed via the established connection.

In this scenario, as in the scenario of FIG. 6B, the average time elapsed between the call setup message 630 and the call connected message 677 may typically be in the range of 100-250 ms. Thus, the improvements of reduced latency and improved user experience relative to the example scenario of FIGS. 5A-B may be realized regardless of whether re-selection is successful.

Figure 7A:
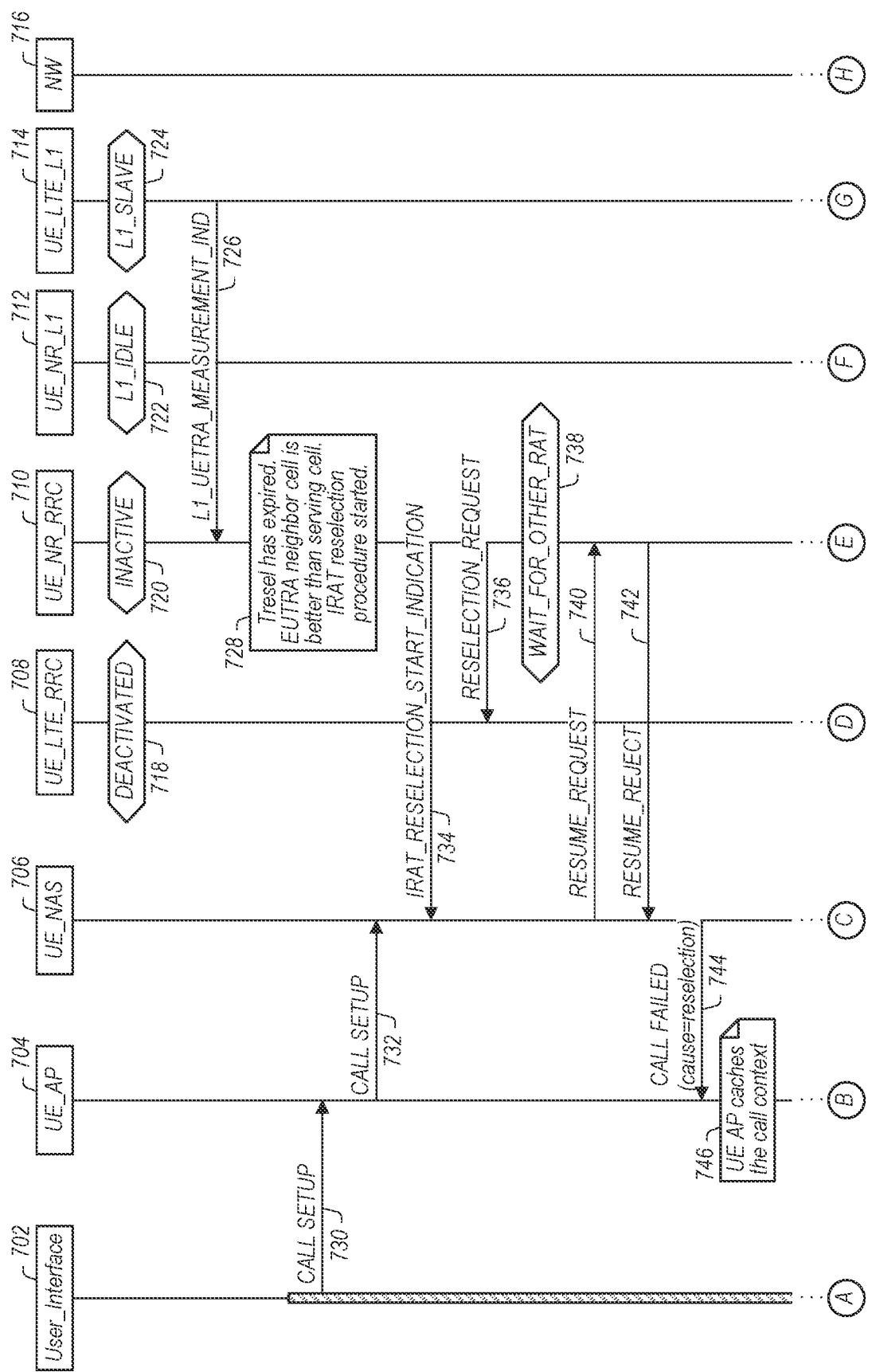
FIGS. 7A-B illustrate a signal flow diagram presenting an example scenario in which the AP may cache call context information during IRAT re-selection, according to some embodiments.
Figure 7B:
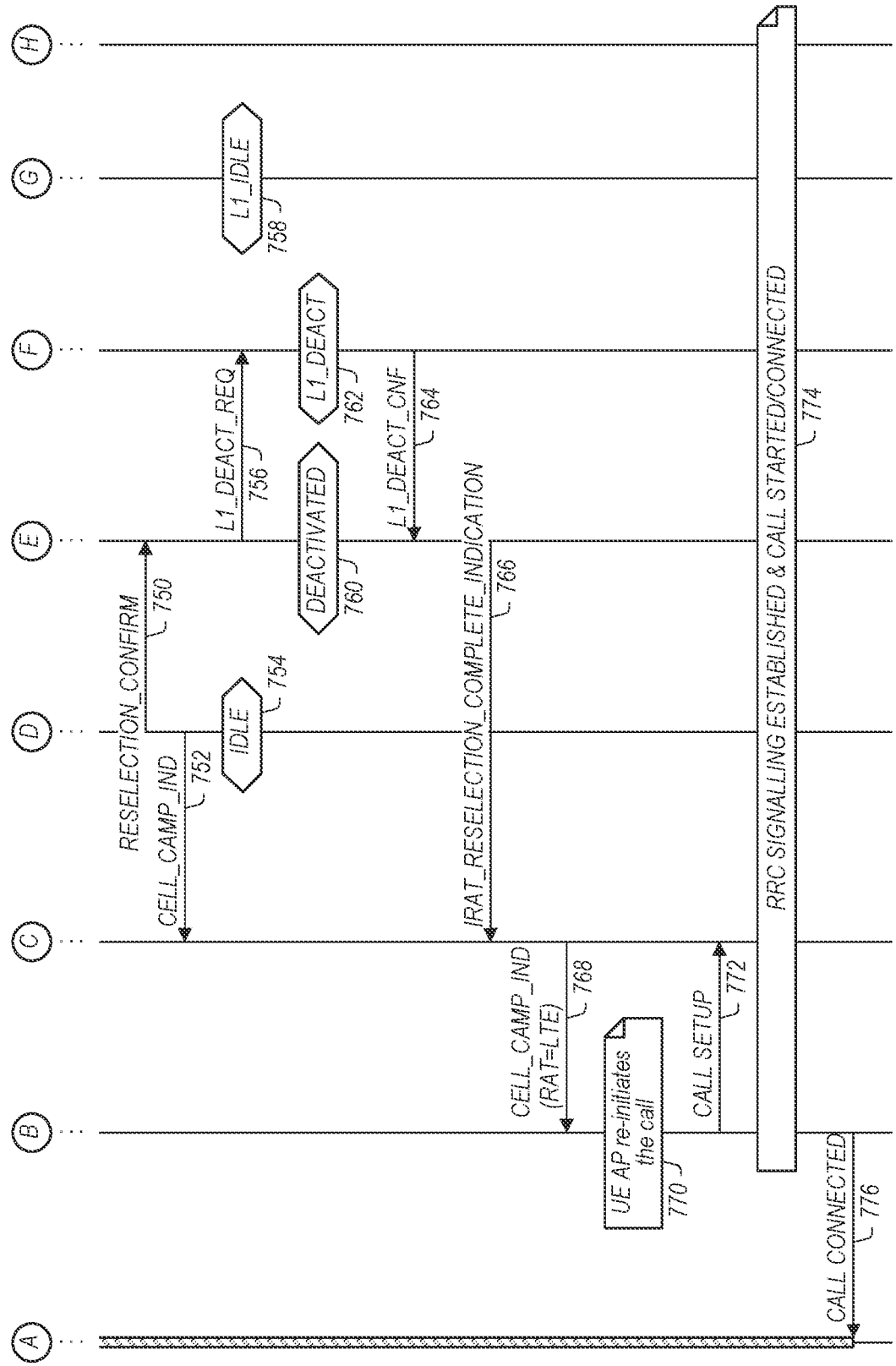

FIGS. 7A-B illustrate a signal flow diagram presenting an example of a scenario in which the UE AP caches a Call Setup message until receiving a Cell Camp Indication, following IRAT re-selection, according to some embodiments. The example scenario of FIGS. 7A-B illustrates an RRC Resume procedure, in which re-selection is successful. It should be understood that a similar approach may be applied in scenarios including an RRC Connection Establishment procedure and/or scenarios in which re-selection is unsuccessful.

The various components of the UE and network illustrated in FIG. 7A may be similar or identical to the corresponding components illustrated in FIG. 6A, except that the components illustrated in FIG. 7A may be configured to perform the alternative solution illustrated in FIGS. 7A-B. For example, the user interface 702 may be substantially similar to the user interface 602, the UE AP 704 may be substantially similar to the UE AP 604, etc. Similarly, the signal exchange illustrated at 718-740 may be substantially similar, or identical, to the corresponding signal exchange illustrated at 618-640.

However, in the example of FIG. 7A, the UE NR RRC 710 does not cache the resume request 740. Instead, the UE NR RRC 710 may respond by providing to the UE NAS 706 a resume reject message 742. The UE NAS 706 may then respond by providing to the UE AP 704 a call failed message 744. In some scenarios, the call failed message 744 may include an indication that the call failure was caused by cell re-selection or, more specifically, by IRAT re-selection. In response to receiving the call failed message 744 indicating that the cause was re-selection, the UE AP 704 may, at 746, cache (or otherwise store) call context information, such as the setup message 732 (or relevant information therefrom), e.g., until the re-selection is complete.

As illustrated in FIG. 7B, the UE LTE RRC 708 may, in response to the reselection request 736, provide to the UE NR RRC 710 a reselection confirm message 750, confirming that re-selection may proceed. The UE LTE RRC 708 may also provide to the UE NAS 706 a cell camp indication 752, indicating that the UE is now camped on the LTE cell, and may enter the IDLE state (754). The UE LTE L1 714 may enter the L1 IDLE state (758).

In response to the reselection confirm message 750, the UE NR RRC 710 may provide to the UE NR L1 712 an L1 deactivation request 756. In response, the UE NR L1 712 may enter the L1 DEACTIVATED state (762), while the UE NR RRC 710 may enter the DEACTIVATED state (760). The UE NR L1 712 may then respond to the UE NR RRC 710 with an L1 deactivation confirmation message 764.

At this point, the UE NR RRC 710 may provide to the UE NAS 706 an IRAT reselection complete indication 766. In response, the UE NAS 706 may provide to the UE AP 704 a cell camp indication 768, which may indicate that the UE is now camped on the LTE cell.

Upon receiving notification that IRAT re-selection is complete, e.g., via the cell camp indication 768, the UE AP 704 may, at 770, re-initiate the call setup. For example, the UE AP 704 may provide to the UE NAS 706 a call setup message 772, which may be identical (or substantially similar) to the call setup message 732, and/or other call context information cached at 746. The UE may then perform signaling as known in the art to establish the call with the LTE cell. Once the call has been successfully connected, the UE AP 704 may provide to the user interface 702 a call connected message 776.

In some scenarios, the user interface 702 may notify the user that the call setup was successful. The call may then proceed via the established connection.

In the scenario of FIGS. 7A-B, as in the scenarios of FIG. 6B and FIG. 6C, the average time elapsed between the call setup message 730 and the call connected message 776 may typically be in the range of 100-250 ms. Similar improvement may be realized in scenarios similar to that of FIGS. 7A-B, involving an RRC Connection Establishment procedure and/or scenarios in which re-selection is unsuccessful.

Figure 8A:
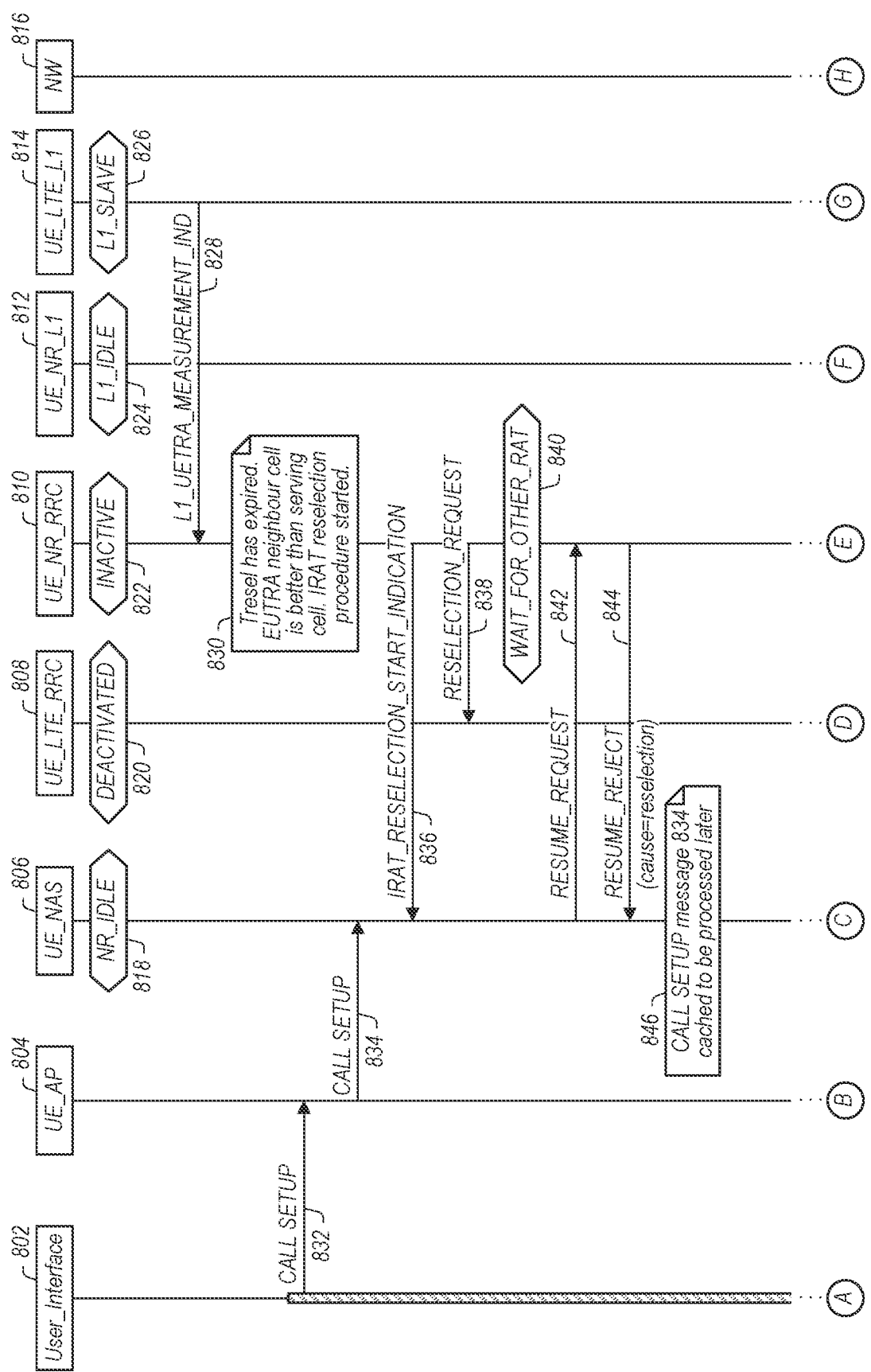
FIGS. 8A-B illustrate a signal flow diagram presenting an example scenario in which the NAS may cache a call setup message during IRAT re-selection, according to some embodiments.
Figure 8B:
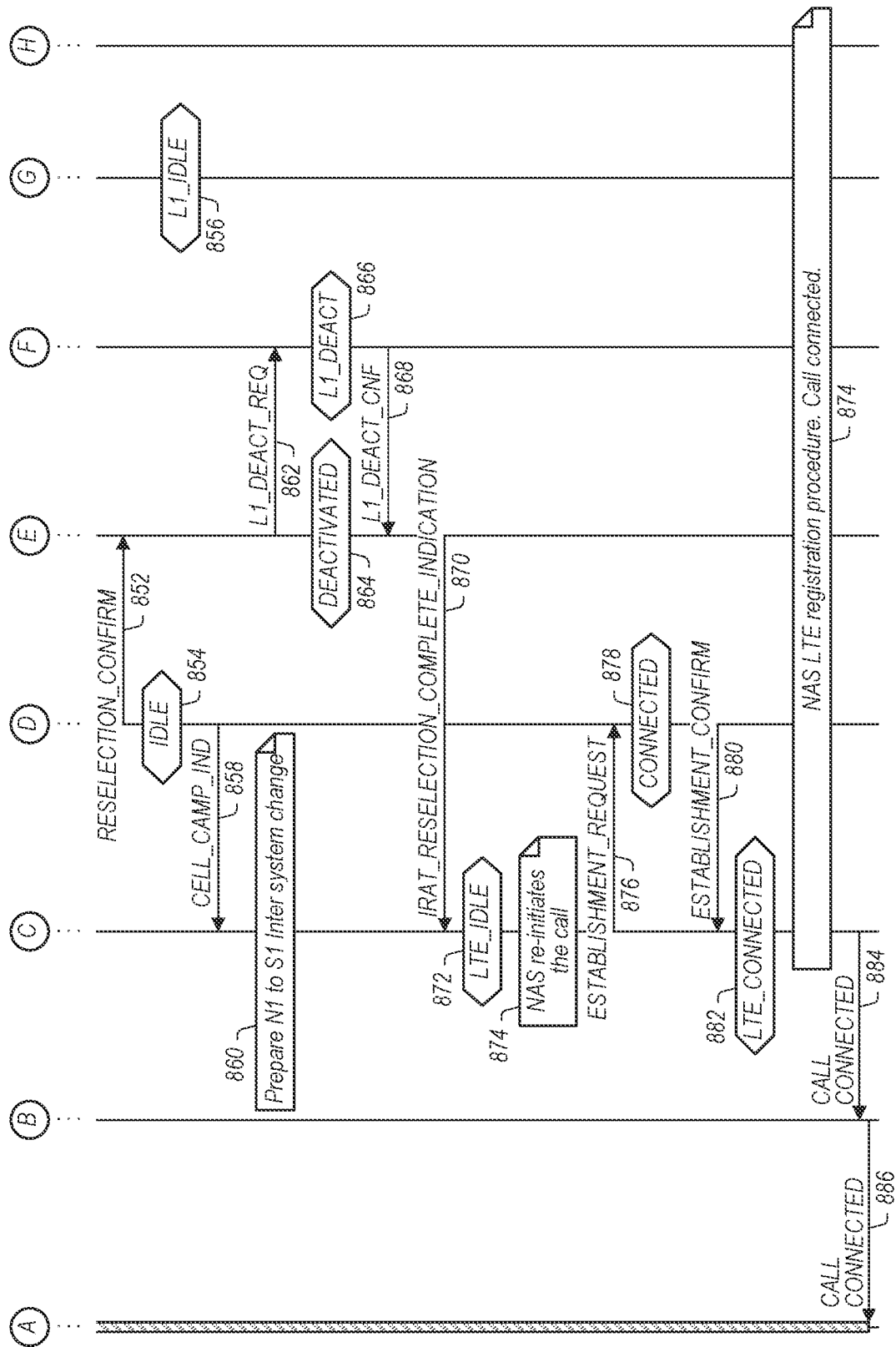

FIGS. 8A-B illustrate a signal flow diagram presenting an example of a scenario in which the UE NAS layer caches a Call Setup message until receiving an IRAT Re-selection Complete Indication, according to some embodiments. The example scenario of FIGS. 8A-B illustrates an RRC Resume procedure, in which re-selection is successful. It should be understood that a similar approach may be applied in scenarios including an RRC Connection Establishment procedure and/or scenarios in which re-selection is unsuccessful.

The various components of the UE and network illustrated in FIG. 8A may be similar or identical to the corresponding components illustrated in FIG. 6A, except that the components illustrated in FIG. 8A may be configured to perform the alternative solution illustrated in FIGS. 8A-B. For example, the user interface 802 may be substantially similar to the user interface 602, the UE AP 804 may be substantially similar to the UE AP 604, etc. Similarly, the signal exchange illustrated at 718-740 may be substantially similar, or identical, to the corresponding signal exchange illustrated at 618-640.

As illustrated in FIG. 8A, the UE may begin with the UE NAS 804 in an NR IDLE state (818), the UE LTE L1 814 in L1 SLAVE mode (826) and the UE NR L1 812 in L1 IDLE state (824). The UE NR RRC 810 may begin in INACTIVE state (822), and the UE LTE RRC 808 may begin in DEACTIVATED state (820). The UE LTE L1 814 may provide to the UE NR RRC 810 an LTE L1 EUTRA Measurement Indication 828, for use in determining whether to perform an IRAT re-selection. In response, the UE NR RRC 810 may, at 830, initiate an IRAT re-selection procedure. For example, the UE NR RRC 810 may initiate the IRAT re-selection procedure based on determining that $T_{reselect}$ has expired and that an EUTRA neighbor cell (e.g., an LTE cell) is ranked above the presently serving cell (e.g., an NR cell).

Similar to FIG. 6A, a user may initiate a call by interacting with the user interface 802. This may cause the user interface 802 to provide a call setup instruction 832 to the UE AP 804, which may similarly provide a call setup instruction 834 to the UE NAS 806.

At some time thereafter, the UE NR RRC 810 may provide to the UE NAS 806 an IRAT reselection start indication 836, to indicate that the IRAT re-selection procedure has begun. The UE NR RRC 810 may also provide to the UE LTE RRC 808 a reselection request 838, and may then wait (840) for a reply based on input from the other RAT (LTE).

As in the scenario of FIG. 6A, in this scenario, the UE NAS 806 receives the call setup instruction 834 before being notified of the IRAT re-selection. The UE NAS 806 may therefore act to complete the call setup procedure prior to acting on the IRAT re-selection procedure. However, the UE NR RRC 810 may begin the re-selection process prior to receiving from the UE NAS 806 any notification of the call initiation. Thus, the UE NR RRC 810 may prioritize the IRAT re-selection procedure. Specifically, upon receiving the call setup instruct 834, the UE NAS 806 may provide to the UE NR RRC 810 a resume request message 842.

As in the scenario of FIG. 7A, the UE NR RRC 810 may respond by providing to the UE NAS 806 a resume reject message 844, which may indicate that the rejection was caused by cell re-selection or, more specifically, by IRAT re-selection. In response to receiving the resume reject message 844, the UE NAS 806 may cache (or otherwise store) the call setup message 834 (or relevant information therefrom), e.g., until the re-selection is complete.

As illustrated in FIG. 8B, the UE LTE RRC 808 may, in response to the reselection request 838, provide to the UE NR RRC 810 a reselection confirm message 852, confirming that re-selection may proceed. The UE LTE RRC 808 may also provide to the UE NAS 806 a cell camp indication 858, indicating that the UE is now camped on the LTE cell, and may enter the IDLE state (854). The UE LTE L1 814 may enter the L1 IDLE state (856).

In response to the cell camp indication 858, the UE NAS 806 may, at 560, prepare an N1-to-S1 Inter-System change, e.g., as known in the art.

Meanwhile, in response to the reselection confirm message 852, the UE NR RRC 780 may provide to the UE NR L1 812 an L1 deactivation request 862. In response, the UE NR L1 812 may enter the L1 DEACTIVATED state (866) while the UE NR RRC 810 may enter the DEACTIVATED state (864). The UE NR L1 812 may then respond to the UE NR RRC 810 with an L1 deactivation confirmation message 868. The UE NR RRC 810 may respond by providing to the UE NAS an IRAT reselection complete indication 870.

In response to the IRAT reselection complete indication 870, the UE NAS 806 may enter an LTE IDLE state (872). Also, upon receiving this notification that IRAT re-selection is complete, the UE NAS 806 may, at 874, re-initiate the call setup, e.g., by processing the call setup message 834 cached at 846, or relevant information therefrom. In some implementations, the UE NAS 806 may treat the call setup message 834 as if it had been received after completion of the IRAT re-selection procedure (e.g., after 572). For example, the UE NAS 806 may provide to the UE LTE RRC 808 an establishment request 876.

The UE may then perform signaling as known in the art to establish the call with the LTE cell. Once the call has been successfully connected, as shown at 878, the UE NAS 806 may provide to the UE AP 804 a call connected message 884. The UE AP 804 may then provide to the user interface 802 a call connected message 886.

In some scenarios, the user interface 802 may notify the user that the call setup was successful. The call may then proceed via the established connection.

In the scenario of FIGS. 8A-B, as in the scenarios of FIG. 6B and FIG. 6C, the average time elapsed between the call setup message 832 and the call connected message 886 may typically be in the range of 100-250 ms. Similar improvement may be realized in scenarios similar to that of FIGS. 8A-B, involving an RRC Connection Establishment procedure and/or scenarios in which re-selection is unsuccessful.

It should be understood that the features of FIGS. 6-8 are focused on resolving the race conditions as described above. Various signals and other elements are illustrated to provide context and illustrate example functionality. However, certain of the signals and other elements illustrated may be omitted, rearranged, or replaced, while still realizing the goals of reducing latency and/or improving the user experience in the event of a race condition between an IRAT re-selection procedure and a call setup procedure. Such arrangements are intended to fall within the scope of the present disclosure.

The various methods illustrated and explained above may provide improved behavior, as visible to the end user, due to reduction of call setup (resume) failure. Call establishment or resume latency is reduced in the race conditions illustrated. This may result in reduction of KPI failure.

If implemented by major UE manufacturers across a functionally significant percentage of UEs in the market, these methods may lead to improved network resource usage.

Figure 9:
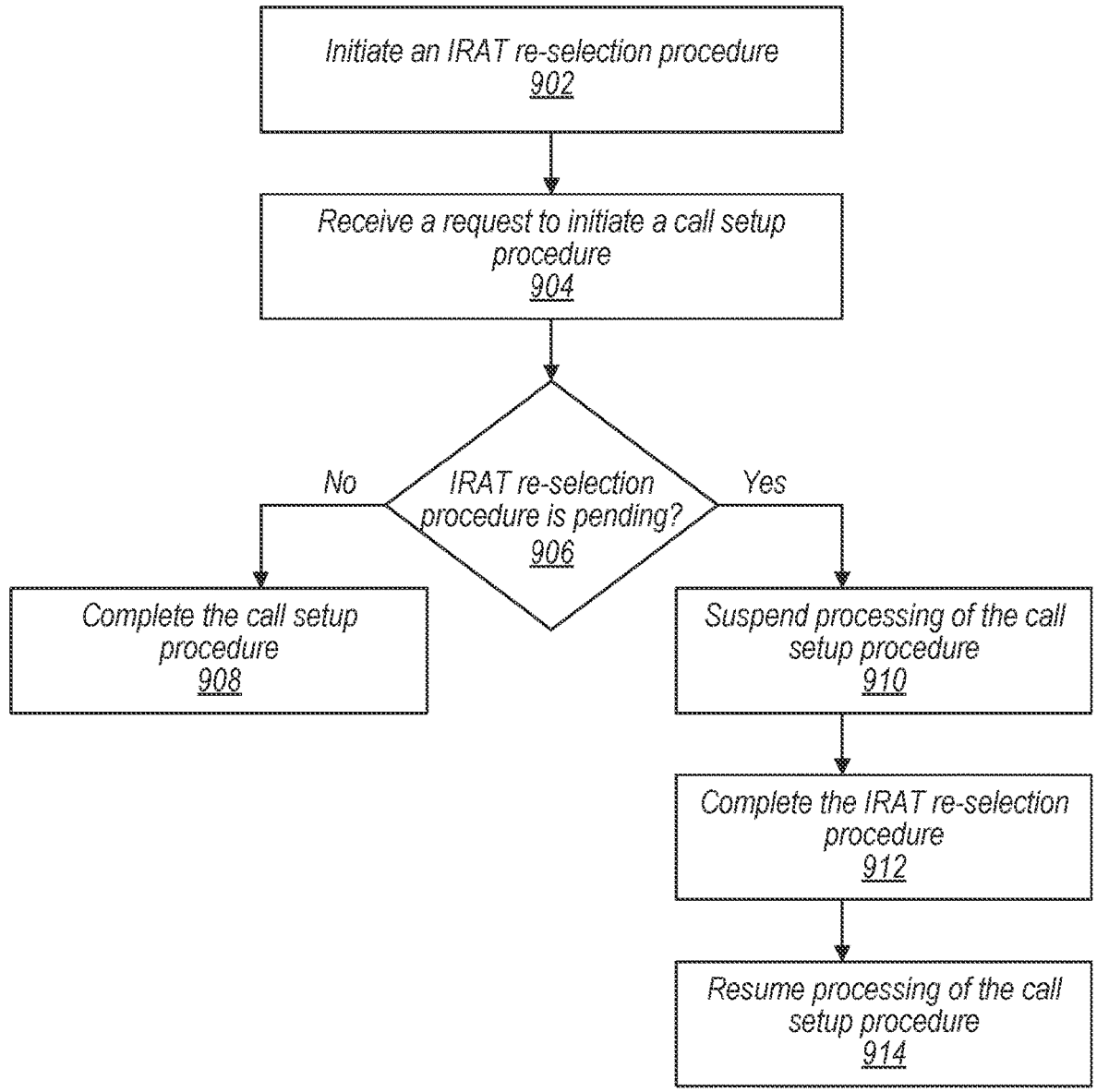
FIG. 9 is a flowchart diagram illustrating a method for reducing latency during IRAT re-selection in the presence of race conditions, performed by a cellular modem, according to some embodiments.
Figure 10:
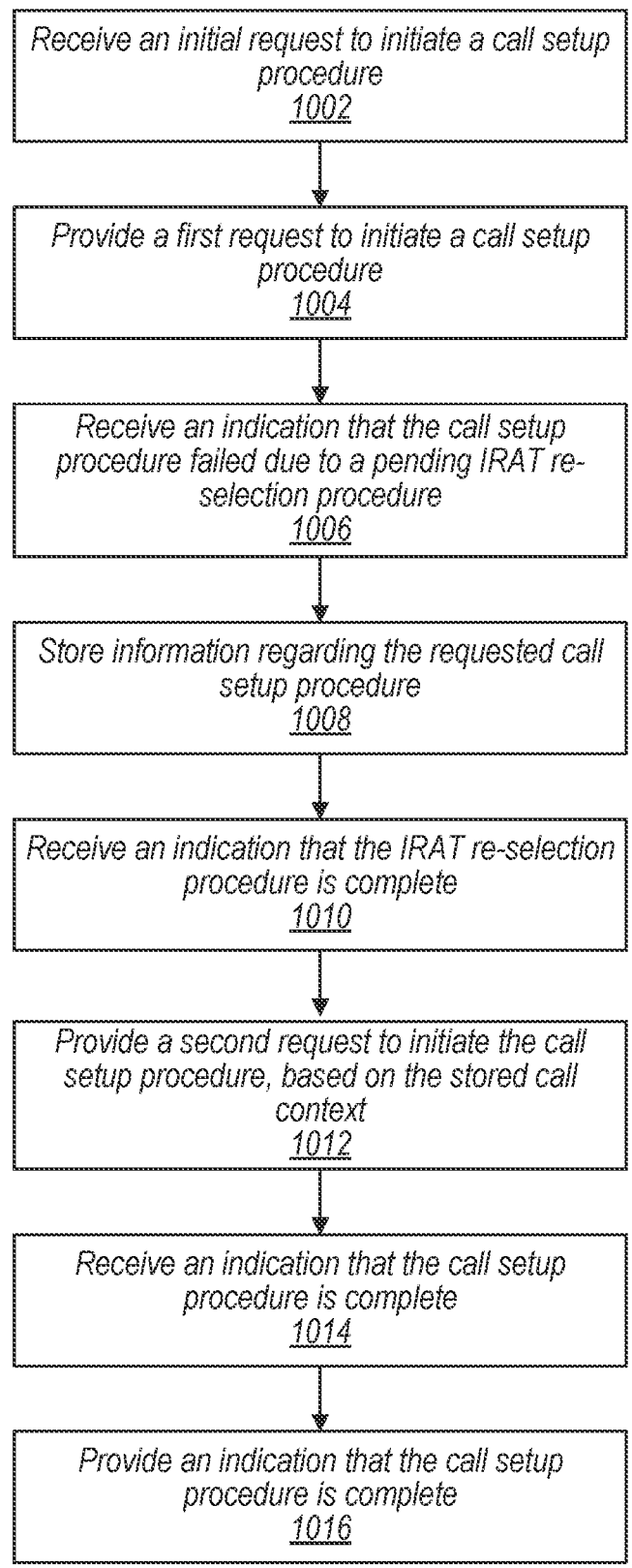
FIG. 10 is a flowchart diagram illustrating a method for reducing latency during IRAT re-selection in the presence of race conditions, performed by an application processor, according to some embodiments.

FIGS. 9-10— Method for Decreasing Latency in Race Conditions

FIG. 9 is a flowchart diagram illustrating a method for reducing latency during IRAT re-selection in the presence of race conditions, according to some embodiments. The method of FIG. 9 may be implemented by a cellular modem (or other cellular communication circuitry) of a UE, such as the UE 106. For example, the method of FIG. 9 may be implemented by the radio 330 and/or the cellular controller 354.

Note that while at least some elements of the method of FIG. 9 are described in a manner relating to the use of communication techniques and/or features associated with 3GPP, LTE, and/or NR specification documents, such description is not intended to be limiting to the disclosure, and aspects of the method of FIG. 9 may be used in any suitable wireless communication system, as desired. In various embodiments, some of the elements of the method shown may be performed concurrently, in a different order than shown, may be substituted for by other method elements, or may be omitted. Additional method elements may also be performed as desired. As shown, the method of FIG. 9 may operate as follows.

At 902, the cellular modem may initiate an IRAT re-selection procedure. For example, this may include one or more of the signals or other elements illustrated above as any of elements 626-638 and/or 828-840, among other signals and/or procedures for initiating an IRAT re-selection procedure.

At 904, the cellular modem may receive a request to initiate a call setup procedure. For example, this may correspond to a call setup message, e.g., as illustrated above as element 632 or element 834. In some scenarios, the request may be received while the IRAT re-selection procedure is pending. In some scenarios, the request may be received at a time prior to the NAS layer of the UE being notified of the IRAT re-selection procedure, but late enough that the NAS layer does not communicate with an RRC layer in response to the request until after the RRC layer has initiated the IRAT re-selection procedure.

In some scenarios, the request may be received from an AP of the UE. In some scenarios, the request to initiate the call setup procedure may be expressly initiated by a user, such as via a user interface of the UE. In other scenarios, the request may be initiated by the AP in response to a software function implemented by the AP.

At 906, the cellular modem may determine whether the IRAT re-selection procedure is pending. If not, the cellular modem may, at 908, complete the call setup procedure, e.g., as known in the art.

However, if the cellular modem determines, at 906, that the IRAT re-selection procedure is pending (e.g., the IRAT re-selection procedure has begun and has not yet concluded), then the cellular modem may, at 910, suspend processing of the call setup procedure.

In some scenarios, suspending processing of the call setup procedure may include an RRC layer of the cellular modem caching (or otherwise storing) a request to resume a suspended call connection or a request to establish a new call connection. For example, suspending processing of the call setup procedure may correspond to caching a resume request message, as illustrated above at element 642. Suspending processing of the call setup procedure may similarly correspond to caching a call establishment request message.

In some scenarios, suspending processing of the call setup procedure may include a NAS layer of the cellular modem caching (or otherwise storing) a call setup request message. For example, suspending processing of the call setup procedure may correspond to caching the call setup message 834, as illustrated at element 846.

At 912, the cellular modem may complete the IRAT re-selection procedure. In some scenarios, completing the IRAT re-selection procedure may include failing to switch to a new cell, e.g., if the IRAT re-selection procedure is unsuccessful. For example, completing the IRAT re-selection procedure may include one or more of the signals or other elements illustrated above as elements 644-652. In some scenarios, completing the IRAT re-selection procedure may include camping on a new cell, e.g., if the IRAT re-selection procedure is successful. For example, completing the IRAT re-selection procedure may include one or more of the signals or other elements illustrated above as elements 645-665 or 852-572.

In response to completing the IRAT re-selection procedure (or in response to determining that the IRAT re-selection procedure is complete), the cellular modem may, at 914, resume the processing of the call setup procedure. In some scenarios, resuming the processing of the call setup procedure may include establishing a call on the original cell, according to the original RAT, e.g., if the IRAT re-selection procedure was unsuccessful. For example, resuming the processing of the call setup procedure may include one or more signals or other elements illustrated above as elements 654-672. In some scenarios, resuming the processing of the call setup procedure may include establishing a call on the new cell, according to the new RAT, e.g., if the IRAT re-selection procedure was successful. For example, resuming the processing of the call setup procedure may include one or more signals or other elements illustrated above as elements 655, 667-675, 860, and/or 874-884.

FIG. 10 is a flowchart diagram illustrating a method for reducing latency during IRAT re-selection in the presence of race conditions, according to some embodiments. The method of FIG. 10 may be implemented by one or more processors, such as an application of a UE, such as the UE 106. For example, the method of FIG. 10 may be implemented by the processor(s) 302 or the UE AP 704.

Note that while at least some elements of the method of FIG. 10 are described in a manner relating to the use of communication techniques and/or features associated with 3GPP, LTE, and/or NR specification documents, such description is not intended to be limiting to the disclosure, and aspects of the method of FIG. 10 may be used in any suitable wireless communication system, as desired. In various embodiments, some of the elements of the method shown may be performed concurrently, in a different order than shown, may be substituted for by other method elements, or may be omitted. Additional method elements may also be performed as desired. As shown, the method of FIG. 10 may operate as follows.

At 1002, the processor may receive an initial request from a user interface component of the UE device to initiate a call setup procedure. For example, the initial request may include the signal illustrated above as element 730.

At 1004, the processor may provide to a cellular modem of the UE device a first request to initiate a call setup procedure. For example, the first request may include the signal illustrated above as element 732. In some scenarios, the first request may be responsive to the initial request of 1002. In other scenarios, 1002 may be omitted, and the first request 1004 may be responsive to a different stimulus, such as a software function executed by the processor.

At 1006, the processor may receive from the cellular modem an indication that the call setup procedure failed because the cellular modem is presently performing an IRAT re-selection procedure. For example, the indication may include the signal illustrated above as element 744.

In response to the indication that the call setup procedure failed, the processor may, at 1008, store information regarding the requested call setup procedure. In some scenarios, the stored information may include the first request or information therefrom. In some scenarios, the stored information may include call context information based on the first request. In some scenarios, storing the information regarding the requested call setup procedure may include the element illustrated above as element 746.

At 1010, the processor may receive an indication from the cellular modem that the IRAT re-selection procedure is complete. In some scenarios, the indication that the IRAT re-selection procedure is complete may include an indication that the UE device is camped on a new cell and/or is utilizing a new RAT, e.g., if the IRAT re-selection procedure was successful. For example, the indication that the IRAT re-selection procedure is complete may include the signal illustrated above as 768.

In response to the indication that the IRAT re-selection procedure is complete, the processor may, at 1012, provide to the cellular modem a second request to initiate the call setup procedure, based on the stored call context information. In some scenarios, the second request may be substantially similar, or identical, to the first request. In some scenarios, the second request may include context information included in the first request. For example, the second request may include the signal illustrated above as 772. It should be noted that the second request may be provided without additional input from the user interface component, beyond receiving the initial request at 1002 (in scenarios in which the initial request was received at 1002).

At 1014, the processor may receive from the cellular modem an indication that the call setup procedure is complete, e.g., responsive to the second request. In some scenarios, the indication that the call setup procedure is complete may include an indication of whether the call setup procedure was successful.

At 1016, the processor may provide to the user interface component an indication that the call setup procedure is complete, e.g., responsive to the initial request. In some scenarios, the indication that the call setup procedure is complete may include an indication of whether the call setup procedure was successful.

Example Embodiments

Various examples may be implemented in accordance with the preceding descriptions, such as the following non-limiting examples.

A cellular modem may include: a non-access stratum (NAS) module; and a radio resource control (RRC) module configured to: store a request message from the NAS module in response to determining that the request message is received during a pending Inter-Radio Access Technology (IRAT) re-selection procedure; subsequently process the request message in response to determining that the IRAT re-selection procedure has been completed; wherein the request message includes one of: a request to establish a call connection or a request to resume a call connection; and wherein processing the requested message includes attempting to establish or resume the call connection.

A cellular modem may include: a radio resource control (RRC) module; and a non-access stratum (NAS) module configured to: receive a call setup request; provide to the RRC module a first call connection request message, based on the call setup request, the first call connection request message including a request to establish or resume a call connection; receive, from the RRC module, a rejection message indicating that the request to establish or resume the call connection was rejected because the cellular modem is performing an Inter-Radio Access Technology (IRAT) re-selection procedure; in response to receiving the rejection message, store the call setup request; receive, from the RRC module, an indication that the IRAT re-selection procedure is complete; and in response to the indication that the IRAT re-selection procedure is complete, provide to the RRC module a second call connection request message, based on the stored call setup request, the second call connection request message including a request to establish or resume a call connection.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of expediting call establishment, the method comprising:
by a cellular modem of a user equipment (UE) device:
initiating an Inter-Radio Access Technology (IRAT) re-selection procedure;
while the IRAT re-selection procedure is pending, receiving a request to initiate a call setup procedure;
in response to determining that the IRAT re-selection procedure is pending, suspending processing of the call setup procedure;
completing the IRAT re-selection procedure; and
in response to determining that the IRAT re-selection procedure is complete, resuming the processing of the call setup procedure.

2. The method of claim 1, wherein suspending processing of the call setup procedure includes a radio resource control (RRC) layer of the cellular modem caching a request to resume a suspended call connection.

3. The method of claim 1, wherein suspending processing of the call setup procedure includes a radio resource control (RRC) layer of the cellular modem caching a request to establish a new call connection.

4. The method of claim 1, wherein suspending processing of the call setup procedure includes a non-access stratum (NAS) layer of the cellular modem caching a call setup request message.

5. The method of claim 1, wherein completing the IRAT re-selection procedure includes failing to switch to a new cell.

6. The method of claim 1, wherein completing the IRAT re-selection procedure includes camping on a new cell.

7. The method of claim 6, wherein resuming the processing of the call setup procedure includes establishing a call on the new cell.

8. A user equipment (UE) device, comprising:
at least one processor; and
a cellular modem, communicatively coupled to the at least one processor, the cellular modem configured to:
initiate an Inter-Radio Access Technology (IRAT) re-selection procedure;
while the IRAT re-selection procedure is pending, receive, from the at least one processor, a request to initiate a call setup procedure;
in response to determining that the IRAT re-selection procedure is pending, suspend processing of the call setup procedure;
complete the IRAT re-selection procedure; and
in response to determining that the IRAT re-selection procedure is complete, resume the processing of the call setup procedure.

9. The UE device of claim 8, wherein suspending processing of the call setup procedure includes a radio resource control (RRC) module of the cellular modem storing a request to resume a suspended call connection.

10. The UE device of claim 8, wherein suspending processing of the call setup procedure includes a radio resource control (RRC) module of the cellular modem storing a request to establish a new call connection.

11. The UE device of claim 8, wherein suspending processing of the call setup procedure includes a non-access stratum (NAS) module of the cellular modem storing a call setup request message.

12. The UE device of claim 8, wherein completing the IRAT re-selection procedure includes failing to switch to a new cell.

13. The UE device of claim 8, wherein completing the IRAT re-selection procedure includes camping on a new cell.

14. The UE device of claim 13, wherein resuming the processing of the call setup procedure includes establishing a call on the new cell.

15. A method of expediting call establishment, the method comprising:
by a processor of a user equipment (UE) device:
providing, to a cellular modem of the UE device, a first request to initiate a call setup procedure;
receiving, from the cellular modem, an indication that the call setup procedure failed because the cellular modem is presently performing an Inter-Radio Access Technology (IRAT) re-selection procedure;
in response to the indication that the call setup procedure failed, storing information regarding the requested call setup procedure; and
in response to an indication from the cellular modem that the IRAT re-selection procedure is complete, provide, to the cellular modem, a second request to initiate the call setup procedure, based on the stored information.

16. The method of claim 15, further comprising:
receiving an initial request from a user interface component of the UE device to initiate the call setup procedure, wherein the first request is responsive to the initial request, and wherein the second request is provided without additional input from the user interface component.

17. The method of claim 15, wherein the indication that the IRAT re-selection procedure is complete includes an indication that the UE device is camped on a new cell.

18. The method of claim 15, wherein the stored information regarding the requested call setup procedure includes the first request.

19. The method of claim 15, wherein the stored information regarding the requested call setup procedure includes call context information regarding the requested call setup procedure.

20. The method of claim 15, further comprising:
Receiving, from the cellular modem, an indication that the call setup procedure is complete.

* * * * *